United States Patent [19]

Spinks

[11] 4,279,393
[45] Jul. 21, 1981

[54] PARACHUTE CANOPY SUSPENSION LINE RELEASE DEVICE AND METHOD

[76] Inventor: Ray E. Spinks, 9320 Earl St., #41, La Mesa, Calif. 92041

[21] Appl. No.: 61,224

[22] Filed: Jul. 27, 1979

[51] Int. Cl.³ .............................................. B64D 17/34
[52] U.S. Cl. .................................................. 244/152
[58] Field of Search ................... 244/145, 148, 151 R, 244/151 A, 151 B, 152

[56] References Cited

U.S. PATENT DOCUMENTS

| | | | |
|---|---|---|---|
| 3,117,753 | 1/1964 | Ewing | 244/152 |
| 3,779,489 | 12/1973 | Matsuo | 244/152 |
| 3,934,848 | 1/1976 | Snyder | 244/151 A |
| 3,958,780 | 5/1976 | Matsuo et al. | 244/152 |

*Primary Examiner*—Charles E. Frankfort
*Attorney, Agent, or Firm*—R. S. Sciascia; W. Thom Skeer

[57] ABSTRACT

An apparatus and method are provided for converting a conventional, non-glidable, circular canopy parachute having a plurality of suspension lines normally fixedly looped at their lower ends of a riser link, into a glidable parachute. This is accomplished by rearranging the looped connection of selected suspension lines so they can be released from the riser links by pulling a tab. When the tab is pulled, pre-selected suspension lines are disconnected, and the parachutist can glide along a desired path.

3 Claims, 10 Drawing Figures

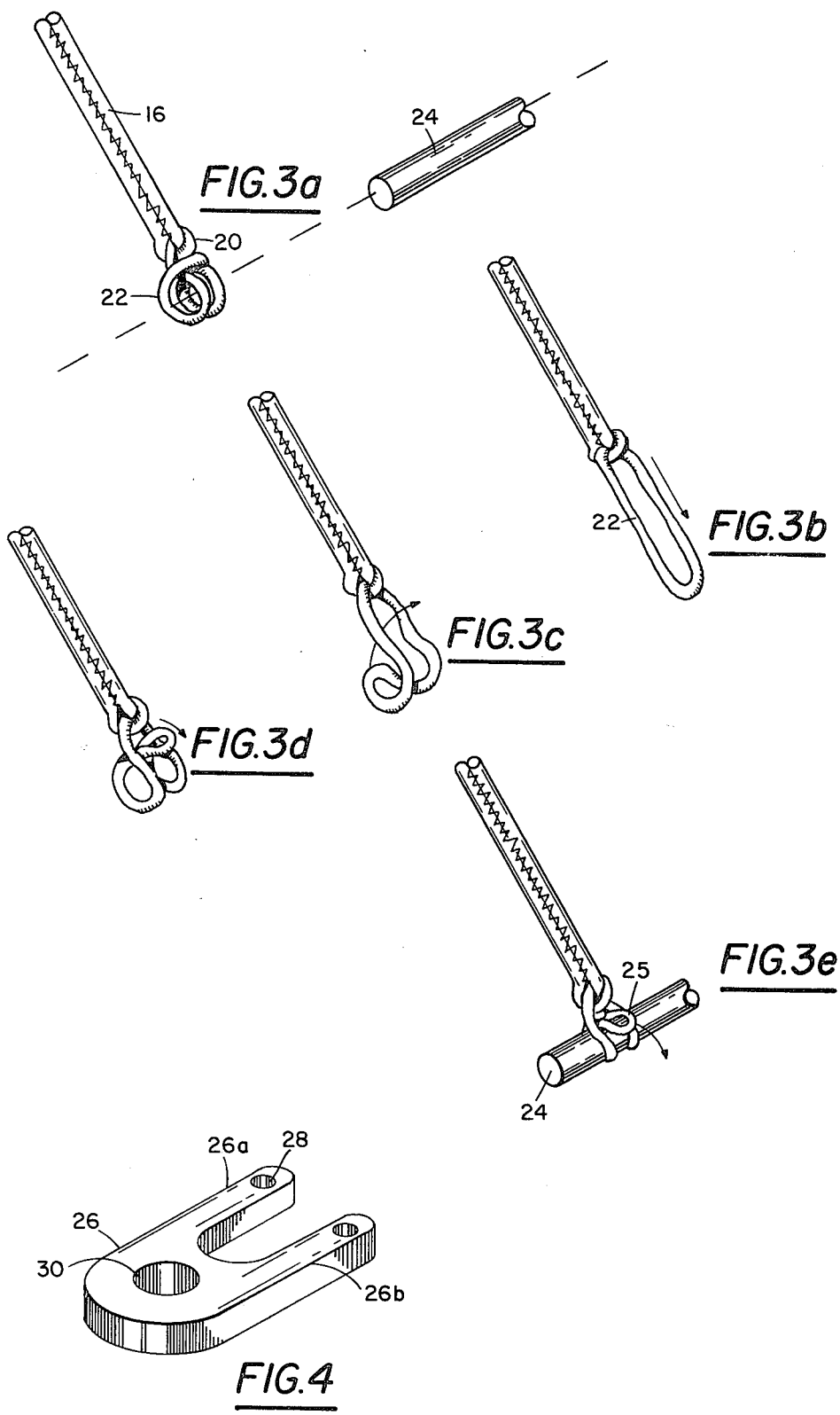

U.S. Patent   Jul. 21, 1981   Sheet 3 of 3   4,279,393
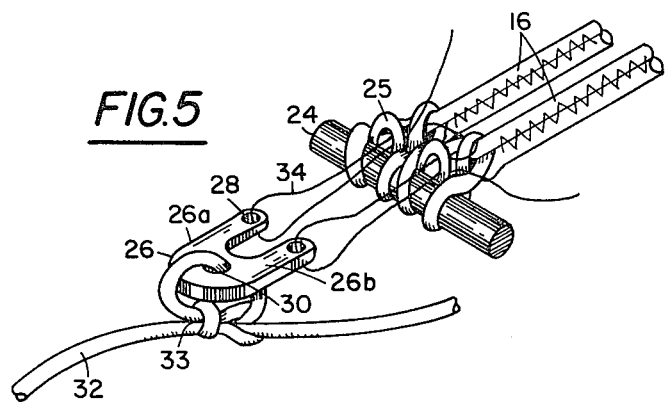
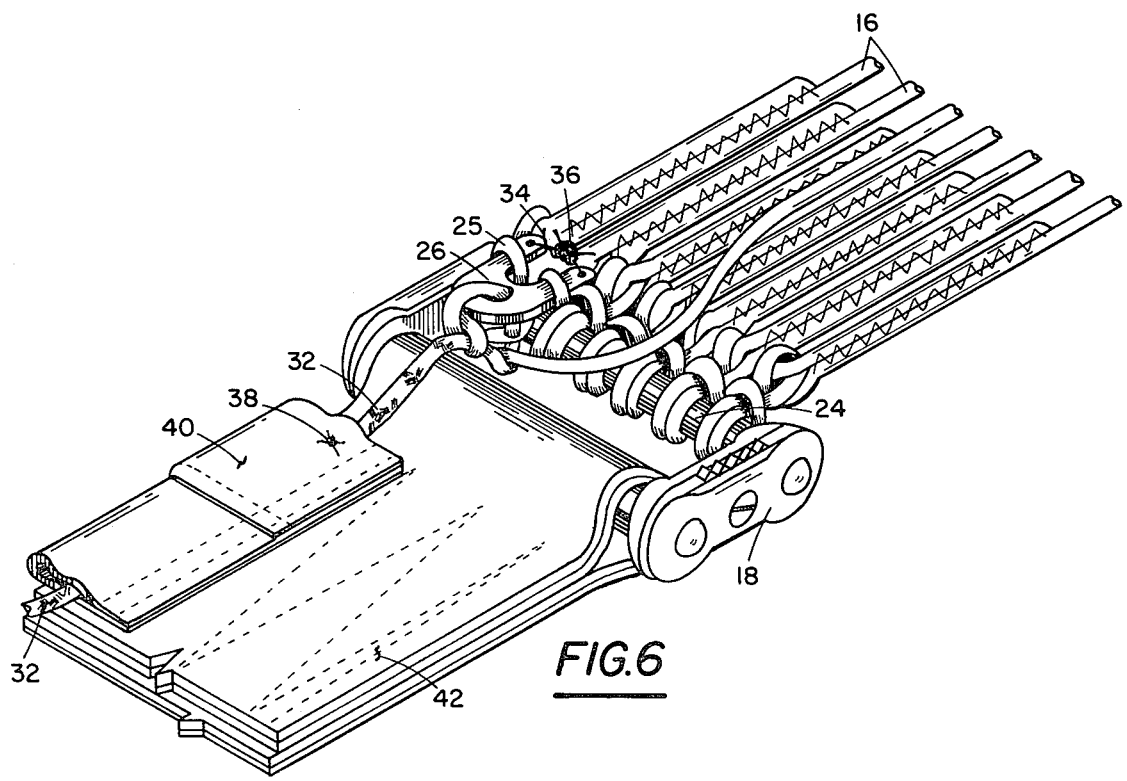

PARACHUTE CANOPY SUSPENSION LINE RELEASE DEVICE AND METHOD

BACKGROUND OF THE INVENTION

This invention relates to parachutes, and more particularly to parachutes that can be steered in a desired path by releasing one or more suspension lines from their riser strap link.

It is known in the art to modify a conventional parachute canopy to be steerable by releasing selected suspension lines from their respective riser links. Such a technique is best illustrated by a U.S. Pat. No. 3,779,489 issued to Jon T Matsuo on Dec. 18, 1973. In that patented construction, the lower looped ends of the selected suspension lines are anchored to their respective riser links by a line arranged in daisy-chain configuration secured in place by a breakable tie line. A sharp pull on the lanyard by the parachutist breaks the tie line, which sequentially unravels the daisy-chain slip knots to jettison the selected suspension lines. This patented parachute system has been adopted by the U.S. Navy as a standard operating procedure, however it has been found that forming the line into daisy-chain is a complicated procedure, and rigging errors have occurred, even with close supervision, which prevents the release of the designated suspension lines and degrades the reliability of the deployed parachute.

SUMMARY OF THE INVENTION

A method and device has been devised which simplifies the rigging of personnel-type parachutes having a steering capability and improves reliability of performance.

In essence, the novel method consists of rearranging the manner in which the lower looped ends of the selected suspension lines are connected to the parachute riser strap link. Instead of the looped ends being releasably connected by a daisy-chain line arrangement, the looped ends of the suspension lines are snubbed by a rigid tab which need only be pulled out of the looped ends to free the respective suspension lines. Usually two suspension lines are released on each of the two aft riser strap links, in which case the tab is formed U-shaped with each leg of the tab snubbing a respective looped end.

OBJECTS OF THE INVENTION

It is a principal purpose of this invention to provide a steerable parachute which is more simple to assemble, and more reliable in operation.

Another important object of this invention is to enable an existing parachute to be retrofitted by rearranging existing structure.

Other objects, advantages and novel features of the invention will become apparent from the following detailed description of the invention when considered in conjunction with the accompanying drawings.

BRIEF DESCRIPTION OF THE DRAWINGS

FIGS. 3a to 3e shows in perspective views the procedure in five sequential steps for rearranging a selected suspension line in the group of FIG. 2 to accommodate the present invention.

FIG. 4 is a perspective view of the novel release tab employed for releasably securing two adjacent suspension lines.

FIG. 5 is an exploded perspective view of the release tab aligned with the looped ends of the respective suspension lines of FIG. 1 to be made releasable.

FIG. 6 shows the suspension lines of FIG. 2 fully assembled and operational having been modified by the teaching of the present invention for achieving the gliding orientation of the parachute of FIG. 1.

DESCRIPTION OF THE PREFERRED EMBODIMENT

Figure 1:
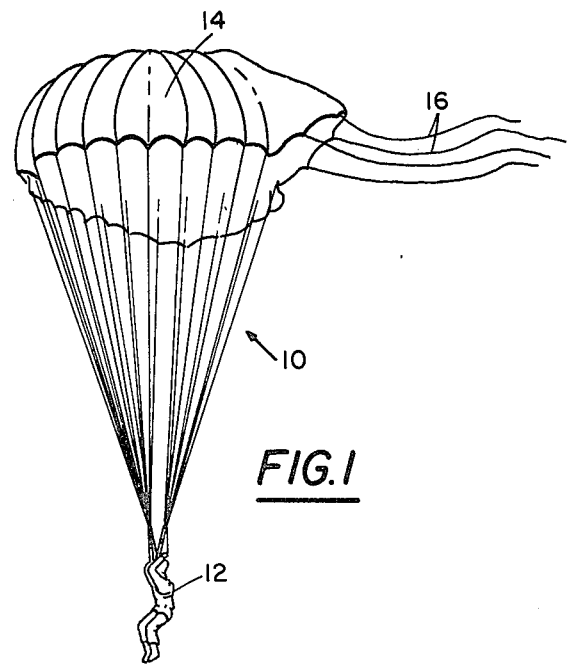
FIG. 1 is a side elevation of a personnel-type parachute deployed in a gliding orientation through the use of the present invention.

Referring to the drawings where like reference numerals refer to similar parts throughout the figures there is illustrated in FIG. 1 a personnel-type parachute 10 deployed by a parachutist 12 to carry him in a steerable gliding orientation. This condition of parachute canopy 14 has been achieved in the past by releasing two suspension lines or shroud lines 16 in each of the two aft riser straps by the parachutist with a knife, or more recently by releasing them through a daisy-chain line arrangement, as described in the above described U.S. Pat. No. 3,779,489. The present invention describes an improvement over both of the prior described techniques.

Figure 2:
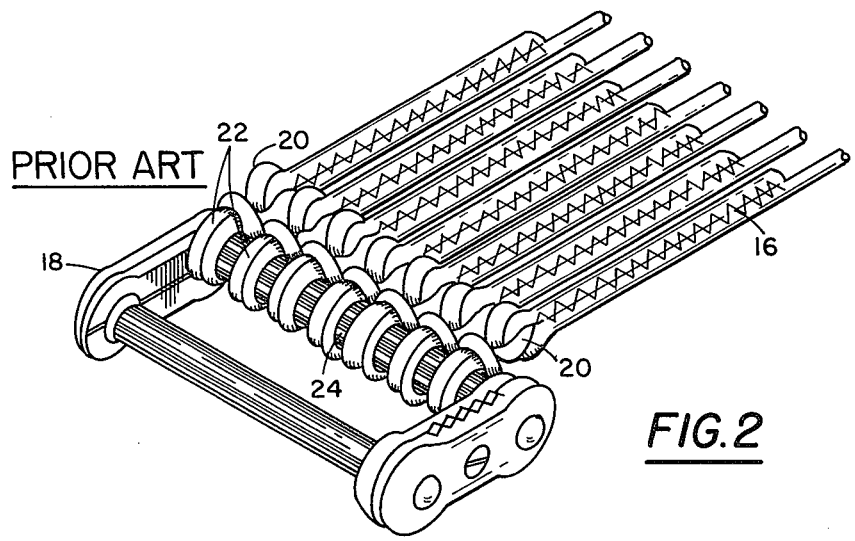
FIG. 2 is a perspective view of a representative group of rear suspension lines attached to a riser strap connecting link in a non-releasable, conventional manner.

FIG. 2 illustrates the conventional non-releasable manner of attaching the lower looped ends of suspension lines 16 to a riser connector link 18. As shown, each suspension line is provided with a looped end 20 formed into a slip knot 22 formed around an achor pin 24 of connector link 18. As none of the suspension lines in this type of installation are readily releasable, it was necessary in the past for the parachutist to cut the two end suspension lines of each of the two rear riser straps with a knife to enable the canopy to achieve a steerable orientation. Needless to say, such a cutting operation is awkward to the parachutist for obvious reasons.

FIGS. 3a to 3e illustrate how one of the two selected suspension lines of the conventional installation in FIG. 2 is modified according to the teaching of the present invention. FIG. 3a illustrates the first step in which connector link pin 24 is slipped laterally from connector link 18 to free the slip knot 22 of looped end 20 of selected suspension line 16. In step two of FIG. 3b, looped end 20 is pulled straight to eliminate the slip knot 22. In steps three and four of FIG. 3c and 3d, the looped end 20 is reversed in direction and the end of the loop 20 is passed upwardly through the center of the bight. In the last step in FIG. 3e, the loop is snubbed tightly around link pin 24 with the end 25 of the loop projecting up beyond the bight for a purpose to be described.

The procedure illustrated in FIGS. 3a to 3e, in effect, changes the way of anchoring the looped ends of the selected suspension lines changing the slip knot which must be cut to be released, to a simple looped end which can be snubbed to link pin 24 until released.

In practice, as illustrated in FIG. 1, it has been found that release of four adjacent aft suspension lines will provide the optimum steering characteristics without sacrificing the necessary lift. FIG. 4 shows a tab 26 which is used to snub the looped ends 25 of two of the suspension lines of a rear riser link, as formed in FIGS. 3a to 3e. Tab 26 is U-shaped, preferably made of rigid sheet metal or the like, having a dimension about ½" in width, about 1" long and 3/32" thick. Each leg 26a and 26b is about ⅛" in width, and spaced apart by ¼" so as to mate with the projecting looped ends 25 of adjacent suspension lines. A drilled opening 28 is provided at the end of each tab leg, and a drilled opening 30 in the base of the tab for purposes presently to be described.

FIG. 5 illustrates the manner of mating tab 26 to the looped ends 25 of the two selected adjacent suspension lines 16 which have been rearranged as illustrated in FIGS. 3a to 3e. A release lanyard 32 conveniently available to the parachutist on his harness is attached to tab hole 30 with a square knot 33. A tack or break line 34 is strung through both holes 28 at the ends of the tab prongs and through looped ends 25 and anchored to the respective suspension lines. In FIG. 6 release tab 26 has been fully connected with the selected suspension lines in an operational position with its leg prongs 26a and 26b passing through looped ends 25 of the selected suspension lines to snub the looped ends of the respective suspension lines to connector link 24. After release tab 26 is fully inserted, the free ends of tack line 34 are tightened and knotted at 36 to secure release tab 26 in the snubbing position. Release lanyard 32 is tacked at 38 to a stowage flute 40 stitched to the riser strap 42.

The present invention provides for a more simple and effective manner of releasably securing selected suspension lines attached to a riser strap connector link which avoids possible rigging errors during the repacking cycle of parachutes.

Obviously many modifications and variations of the present invention are possible in the light of the above teachings. It is therefore to be understood that within the scope of the appended claims the invention may be practiced otherwise than as specifically described.

What is claimed is:
1. A glidable personnel-type parachute comprising:
   a canopy having a peripheral skirt;
   a plurality of suspension lines having upper ends connected to spaced points around said peripheral skirt and having looped lower ends;
   said suspension lines being divided into a plurality of groups, said suspension lines in each group being connected at their lower looped ends to a respective parachute riser strap link;
   preselected groups of said suspension lines being connected to their respective riser strap links by a connection made by making said lower looped ends of two adjacent suspension lines into releasable bights around said parachute riser strap link; and including
   a rigid U-shaped tab having the legs of said U inserted into said releasable bights with each leg of said U-shaped tab snubbing one of said releasable heights of said adjacent suspension lines;
   means for securing said U-shaped tab; and
   means for selectively releasing said U-shaped tab from said releasable bights to free said preselected groups of said suspension lines for permitting gliding of said parachute.

2. The parachute of claim 1 where said securing means is a break cord having a predetermined tensile strength.

3. The parachute of claim 2 wherein said U-shaped tab member is provided with an aperture at the end of each leg and the base.

* * * * *